Jan. 23, 1940. W. H. HECKMAN Re. 21,330

JOURNAL BEARING

Original Filed July 15, 1932 3 Sheets-Sheet 1

Witness:
P. B. Davison.

Inventor:
William H. Heckman
By: Paul Carpenter
Atty.

Jan. 23, 1940. W. H. HECKMAN Re. 21,330

JOURNAL BEARING

Original Filed July 15, 1932 3 Sheets-Sheet 2

Witness:
R. B. Davison

Inventor:
William H. Heckman
By: Pierce Arpenter
Atty.

Jan. 23, 1940. W. H. HECKMAN Re. 21,330

JOURNAL BEARING

Original Filed July 15, 1932 3 Sheets-Sheet 3

Witness:
R. B. Davison

Inventor:
William H. Heckman:
By Paul Carpenter
Atty.

Reissued Jan. 23, 1940

Re. 21,330

UNITED STATES PATENT OFFICE 21,330

JOURNAL BEARING

William Hunter Heckman, Chicago, Ill.

Original No. 2,072,168, dated March 2, 1937, Serial No. 622,692, July 15, 1932. Application for reissue May 25, 1938, Serial No. 209,858

29 Claims. (Cl. 308—79)

This invention relates in general to improvements in journal bearings, and more particularly to improvements in the type of journal bearing especially adapted for use on railway rolling stock, and while the invention is illustrated and described as incorporated in a journal box and journal bearing for the axles of railway cars and the like, it will be understood that the invention may be employed for other analogous purposes.

The present existing types of railway journal boxes and journal bearings generally include a box or housing open at one end to receive the journal below which a lubricant soaked packing of waste or other material is carried by the box, the other end of the box having a suitable cover permitting access to the interior thereof, a half or less bearing member being mounted in the top of the box and lying against the journal, a suitable keeper plate, commonly called a wedge being interposed between the said half-bearing, commonly termed a brass, and the top of the box. This type of bearing has been improved more or less in recent years by modified forms of lubricating systems, but owing to the trend toward higher speeds and greater loads, the possibility of hot bearings has been increased, due to low bearing area or surface producing increased friction per unit area and due to inadequate lubrication, or due to shreds of waste getting between the collar of journal and outer end of brass. Further difficulties arise due to collar heat caused by wheel flange wear, which cannot be readily avoided in the prior art bearings. Such bearings require positive, dependable lubrication in combination with a sufficient bearing surface to reduce the concentration of heat, and one of the objects of the present invention is to provide an improved bearing in which adequate and efficient lubrication may be assured with a desirable conservation of the lubricant at all times, in which an increased area of bearing surface is provided, which is constantly changed while the car or engine is in motion, so that with the thus increased area of bearing contact and constantly changing bearing surface I am enabled to provide a bearing which will operate over long periods of time with relatively little attention and yet will support heavy loads efficiently at high speeds. Furthermore, the nature of the bearing is such that its dimensions and the fact that it surrounds the journal serves to keep the journal in proper position with respect to wheel centers, since the bearing extends below the point at which the greatest thrust occurs and takes up this thrust and prevents the brass from raising away from the journal as now tends to occur in standard A. R. A. bearings.

The present invention has as further objects and advantages the provision of an improved floating bearing bushing for wheel journals, which is adaptable to existing journal boxes, so that the necessity for complete replacement of the existing journal boxes or axles, or of machine work or other change on axle journal or wheel hub is not necessary to the employment of my invention; and the provision of an improved bearing for journals in which the bearing elements, including the so-called wedge member and the floating bushing and lubricant housing or shield may be installed in and removed from the journal box, without the necessity of taking the box out of the truck frame, making the invention particularly useful in connection with freight car trucks; although it will be understood that the invention is useful on passenger car, engine front and trailer trucks or on the trucks of street railway, subway, elevated and other railway rolling stock; and the provision of an improved journal bearing in which a constant supply of adequate lubricant may be maintained at all times and in which lubricant may be, if desired, in some circumstances introduced under pressure to the surfaces of contact of the bushing, journal and supporting bearing.

This invention also contemplates the provision of an improved arrangement of the floating bushing whereby it may be adjusted upon installation to fit the journal; the provision of an improved shield to house the floating bushing to protect the same against the entrance of extraneous matter; the provision of an improved journal bearing in which the lubricant supplied to the journal bearing is retained by the rotatable bushing and in which a constant supply of lubricant is taken up by the bushing as it rotates for distribution over the entire surface of the journal and bearing; the provision of an improved journal bearing in which a relatively heavy lubricant known as hard grease may be employed initially forced under pressure to the wearing surfaces of the journal and bearing; the provision of an improved journal box of the character referred to in which the bearing surfaces are maintained in proper relative positions even when the car may be unloaded by car dumping means and in which this may be accomplished with a standard journal box without danger of loss of the lubricant; and the provision of an improved journal bearing in which the defects of the prior art bearings, such as collar heat, are eliminated and which responds to all of the requirements of the A. R. A. and meets the requirements of modern fast freight or high-speed express passenger service.

The foregoing, and such further objects and advantages as may appear or be pointed out as the description of this invention proceeds are contained in the accompanying drawings of which:

Figure 1:
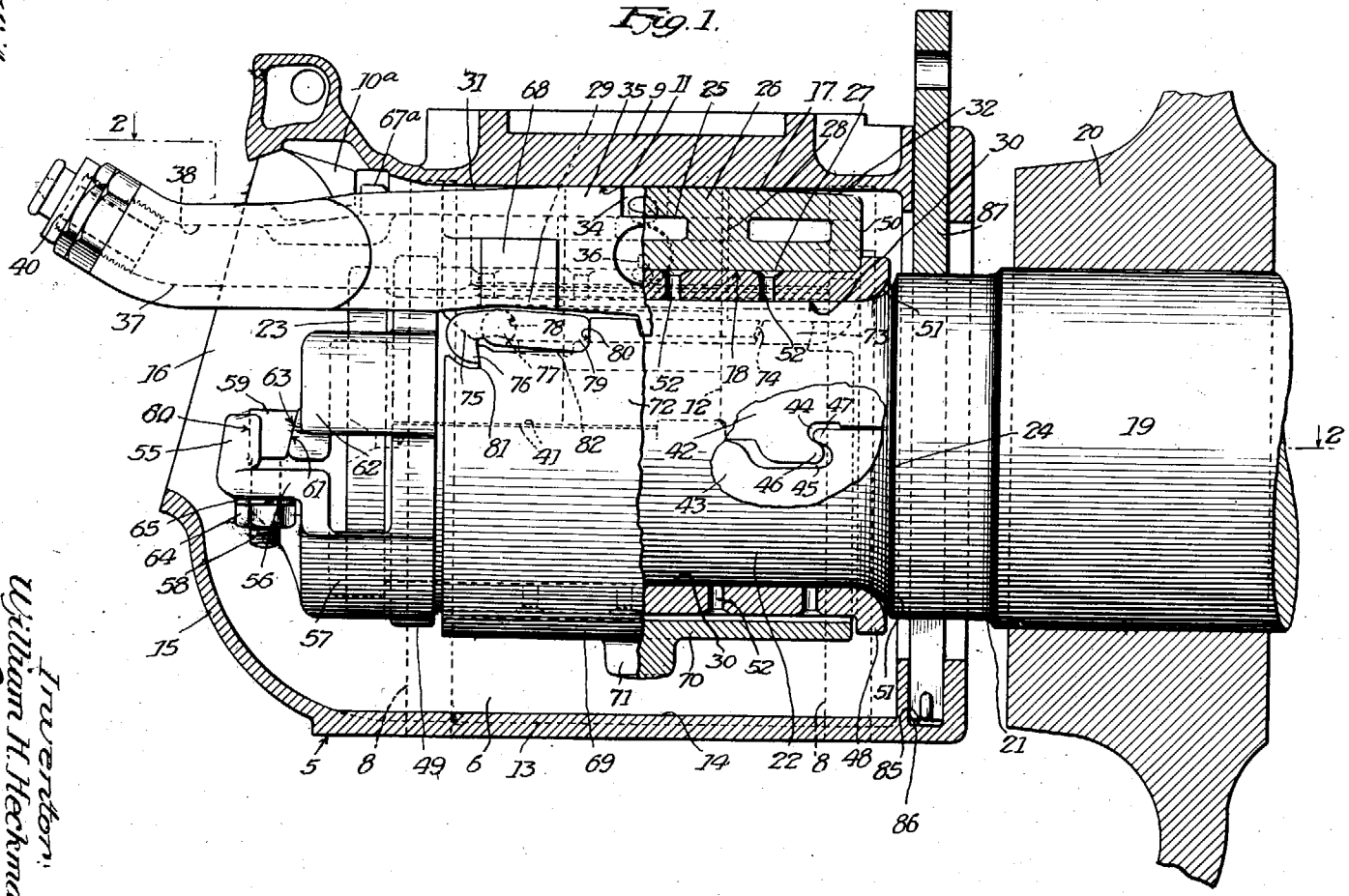
Figure 1 is a longitudinal sectional view of a journal box and journal bearing incorporating improvements of this invention and taken on a vertical line.

Referring now more particularly to the drawings, it will be observed that I provide the standard journal box or housing 5, which in the present instance is shown as an original installation with the present invention therein, but which will be suitably modified as will hereinafter appear where the essential parts of my invention are incorporated in an already existing journal box.

The box 5 is composed of the longitudinal vertical side walls 6, whose lower edges are extended as at 7, to provide reinforcing portions co-operating with vertical external lugs 8, in spaced relation, said lugs being so arranged as to serve to embrace the spaced legs forming the pedestal jaw of the truck frame (not shown) provided for receiving the journal box. The top 9, of the box may be of the conventional form required to fit different styles of truck frames. The external configuration of the box will, it will be understood, be subject to variation in accordance with the type of truck to which the box is to be applied, and does not essentially enter into the present invention. In some cases the box might even be cast integrally with the truck frame, a common practice in the case of freight cars and other trucks.

The inner surface of the top wall 9, indicated at 11, is substantially flat and the inner surfaces of the side walls 6 are provided, as in standard practice, with the vertical abutments 12, it being understood that these abutments are to be found in the conventional journal box now in common use, and serve the purpose of forming retaining abutments for preventing the wedge or bearing member, within limits, from sliding longitudinally in the box, and also serve to take lateral thrust. These abutments perform substantially the identical function in the present invention performed by them in standard practice. Front stops 10*a* are also found in the box which perform a function as will hereinafter appear.

It will be observed that the journal box, being of the conventional form, is provided with front stops 10*a*, which prevents movement in an outward direction of the bearing block 17 hereinafter described, and it will also be understood that the vertical abutments 12, generally termed side stops, are cut away at their lower portions for a short distance to accommodate the rotating journal bearing or bushing hereinafter described. This is substantially all of the changes required on the standard journal box to accommodate the bushing structure of this invention. A further slight change will be required in the rear end of the box, that is the wheel end, which will be pointed out hereinafter.

It will thus be observed that the two front stop members prevent movement away from the wheel end of the box on the part of the lubricant containing block hereinafter described and that the side stops serve to prevent movement of the block 17 in the opposite direction, that is toward the wheel, but that in any event there is sufficient clearance provided to permit of a slight endwise movement which is desirable as will hereinafter appear.

It may be well to point out here that the axle 19 carries the wheel, fragmentarily shown at 20, said axle being of the conventional form provided with a reduced portion 21, which is adapted to be engaged by the dust guard generally indicated at 87, and a further extended reduced portion 22, which forms the actual journal and is adapted to engage the bearing in the journal box. The outer end of the journal, which is the end remote from the wheel, is conventionally provided with an annular flange 23, the bearing proper lying between the circumferential shoulder 24 and said annular flange, thus in a measure limiting the possible end play or thrust of the journal in the box.

The bearing block 17 referred to above is conveniently provided with a compartment 25, by virtue of the double walls 26 and 27, the wall 27 being arcuate and curved as indicated at 18 to make a running fit on the floating bushing interposed between the same and the reduced portion 22 of the axle.

Within the compartment 25 I provide a plurality of abutments 28, which connect the two walls 26 and 27, thus preventing distortion of these walls due to heat and load.

The walls 27, near the longitudinal straight edges thereof, in each instance is provided with an elongated groove 29, communicating with the lowermost portions of the compartment 25, by the provision of ports 25*a*, these grooves thus establishing communication between the compartment 25, which is adapted to contain a lubricant, and the adjacent surface of the floating bushing designated 30, and to be more particularly described later.

The bearing block 17 is longitudinally disposed in the journal box and the upper wall of said block is tapered at its ends as indicated at 31 and 32, similarly to the conventional form of the so-called wedge or the bearing block now employed in journal boxes so that the installation of the bearing 17 in a conventional existing box is thereby facilitated. This tapering also permits of a certain amount of rocking movement of the box on the bearing block with respect to the journal such as becomes necessary to allow for lateral play or swaying of the truck proper, particularly where the box is not spring-mounted on the truck frame. This also allows for displacement due to superelevation of the track on curves.

The upper wall 26 of the block 17 is provided with threaded apertures 33 enclosed by suitable plugs, these apertures being disposed with their longitudinal axes on radii described from the center of the axle, that is to say from the center of the aperture to the inner surface of the block wall 27. The upper wall 26 is suitably recessed as indicated at 34 to accommodate the heads of the closing plugs.

It will be observed that the block 17 has its longitudinal walls 35 disposed between and adjacent to the internal abutments 12 within the journal box, so that substantial transverse movement of the block is effectually prevented, although the desired rocking movement due to the tapered ends may take place. The bearing surface 18 of the wall 27 of the block is provided with one or a plurality of transverse grooves 36 which communicate with the longitudinal grooves 29 previously described, thus an adequate distribution of the lubricant contained within the chamber 25 is had at all times on the arcuate bearing surface 18 of the block 17.

For the purpose of introducing lubricant to the chamber 25, I provide a neck portion 37 having an internal conduit 38 which extends through a suitable aperture 39 in one of the walls of the journal box. Where the device of this invention is inserted into an existing journal box, the upper right hand portion of one of the side walls may be removed to receive the neck 37.

On the other end of the neck 37, I provide any suitable means for forming connection with a grease gun or the like, such, for example, as a standard grease connection known to the trade as an Alemite connection, and indicated at 40. This arrangement permits of the introduction of relatively hard grease into the chamber for lubricating the bearing.

Figure 3:
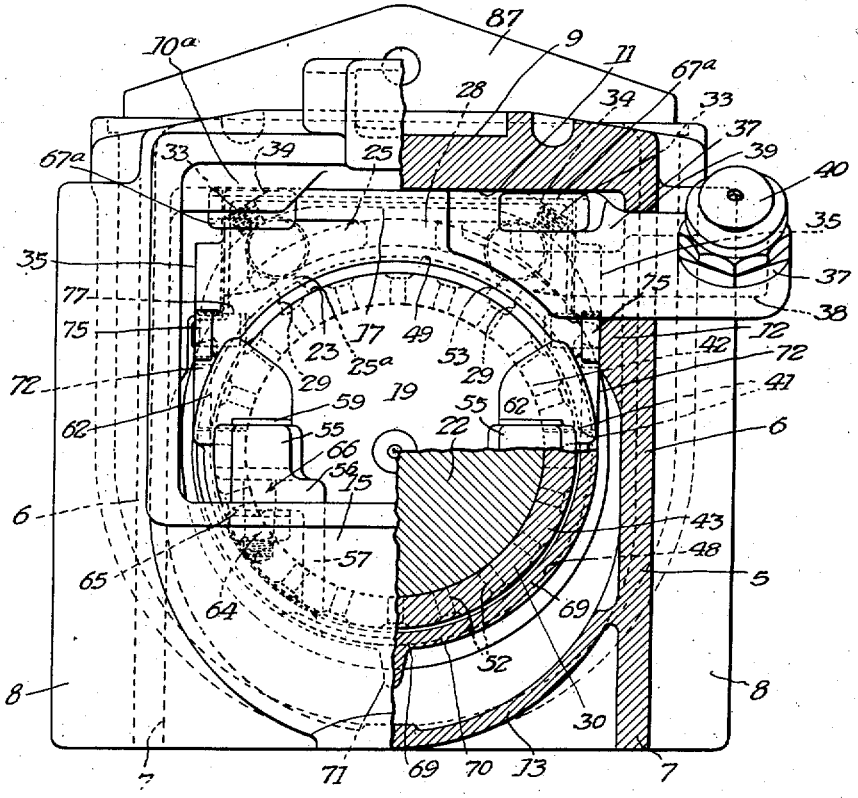
Figure 3 is a composite end elevation and vertical transverse sectional view, parts being broken away to more clearly illustrate the invention.
Figure 4:
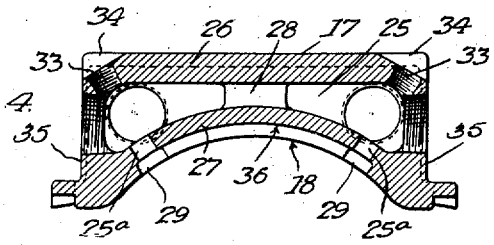
Figure 4 is a transverse sectional view of bearing block taken on the line 4—4 of Figure 2, looking in the direction indicated by the arrow.
Figure 5:
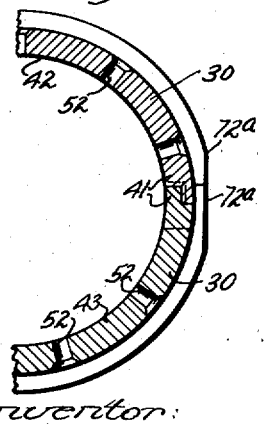
Figure 5 is a sectional detail view of the floating bushing.

The floating bushing 30, previously generally referred to, is preferably made in two half sections, although it will be understood that this bearing may be made in more than two sections if desired. These sections are substantially half sections as best appears by the dotted lines indicated at 41—41 in Figures 1 and 3. A portion of the journal has been broken away in Figure 1 so as to show the junction between the two half sections. Each of the two half sections which, for convenience, are designated 42 and 43, at diametrically opposite points, are provided with complemental recesses 44 and 45, complemental projections 46 and 47 being provided for engagement in the recesses 44 and 45 respectively. Thus, when the two sections of the floating bushing are applied to the journal, the projections 46 and 47 on diametrically opposite parts of the bushing will engage in their respective recesses, thus holding the inner or wheel end of the bushing about the journal.

These projections 46 and 47 and their recesses are so proportioned as to size and angularity of surface that upon tightening of the clamping means hereinafter described, the two sections of the bushing will be brought into substantially transverse alignment as shown in Figure 1 of the drawings.

The ends of the bushing are provided with circumferential radial flanges 48 and 49, which in the case of the flange 48 serves to engage the adjacent end surface 50 of the block 17 and at the same time to form a thrust bearing for engagement at times with the shoulder 24 on the journal, the flange 48 being appropriately beveled or curved as at 51 to facilitate such engagement.

The opposite end flange 49 lies inside the flange or collar 23 which is found on substantially all journals.

In order to insure a complete distribution of lubricant over the internal and external bearing surfaces of the bushing, the latter is provided with a plurality of apertures 52 which have their outer ends countersunk or flaring so as to facilitate the reception of lubricant from the grooves in the bearing surface 18 of the block 17. In this manner a thorough distribution of lubricant is obtained as the bushing rotates.

Another advantage of countersinking the outer ends of the apertures 52 in the rotating bushing is that the actual area of contact between the bushing and the bearing block 17 is reduced so that the tendency for heating of the bearing under heavy loads is materially reduced. The number of apertures provided and the size of the countersunk portions thereof can be best determined in connection with bearings for various purposes and depending on the degree of maximum load to which the bearing is to be subjected and whether it is to be used in high-speed service or not.

In order to bring the two sections of the bushing into snug engagement with the journal so that there will be no chatter or lost motion between the two, I provide connecting and adjusting means on each of the bushing sections. These means are preferably in duplicate at substantially diametrically opposite points so that an accurate and proper adjustment can be obtained from without the journal box. The connecting means referred to comprise in each case an abutment 55, carried by a longitudinally extending lug 56 which is, in turn, cast integrally with an extension 57 of the complemental bushing section, this extension projecting from the end flange 49 remote from the wheel end of the journal. The lug 56 is provided with an aperture through which a bolt 58 extends, said bolt having a special shape of head 59, one surface 60 of which engages the abutment 55, and the opposite surface of said bolt, indicated at 61, being inclined so that the bolt head 59 in effect forms a wedge.

The complemental section of the bushing is provided with an abutment 62 which has an inclined surface 63 disposed in alignment with and complemental to inclined surface 61 of the head 59 of the bolt 58. A nut 64 lies beneath the lug 56 and by right hand turning of said nut the head 59 is drawn down between the abutments 55 and 62, thus moving the two bushing sections longitudinally with respect to each other. This movement of the bushing sections, due to the projections 46 and 47, and their engagement with the recesses 45 and 44, respectively, brings the two sections of the bushing into engagement with the journal with a rotating fit. Any suitable means may be employed for locking the nut 64, such, for example, as a split washer or the like shown at 65. It will be observed that the connection just described and shown in side elevation in Figure 1 is duplicated at a substantially diametrically opposite point, that is to say, the abutments and bolt are as a complete assembly duplicated diametrically opposite and indicated generally at 66 in Figures 2 and 3. Thus a nicety of adjustment may be obtained by separate manipulation of the two adjusting wedges. It will be observed that the abutments 55 and 62 and their associated elements are extended a sufficient distance beyond the collar 23 so that as the bushing section and these connecting elements rotate there is no interference or contact of the same with either the walls of the journal box or the collar 23, sufficient spacing being permitted to allow for end play of the journal with respect to the bushing.

Additionally the angularly offset relation of the portion 56 and the surface 63 with respect to the extended abutments 55 and 62 respectively, not only bring the connection to a position where it can be readily adjusted, but also affords a structure having a certain resiliency, which, when the nut 64 is tightened on the bolt 58, compensates for wear in the bushings and keeps the sections snugly clamped together.

Reverting now to the block 17, in order to limit the distance to which the same may be moved into the journal box, I provide lugs 67 and 68 on the side walls of the block which at times serve to abut the side stops 12 and thus limit the longitudinal movement of the block in the journal box in one direction. The block 17 is also provided with projections 67*a*, which are adapted to engage the front stops 10*a* at times for limiting endwise movement of the block.

In order to form a protecting shield for the rotating bushing and to prevent undue loss of lubricant from the apertures 52 due to centrifugal force as the bushing rotates, I provide a grease retaining and protecting shield generally designated 69. This shield 69 is formed with a partially cylindrical portion 70 having at its center, that is, between the ends thereof and below the bushing, a rib 71. The arcuate portion 70 of the shield is described about the centre of the journal, and this shield is spaced from the adjacent surface of the floating bushing, sufficiently to prevent any contact with the bushing surface itself but close enough to retain lubricant which may be thrown from the bushing as it rotates, thereby preserving lubricant for continued current use.

Figure 2:
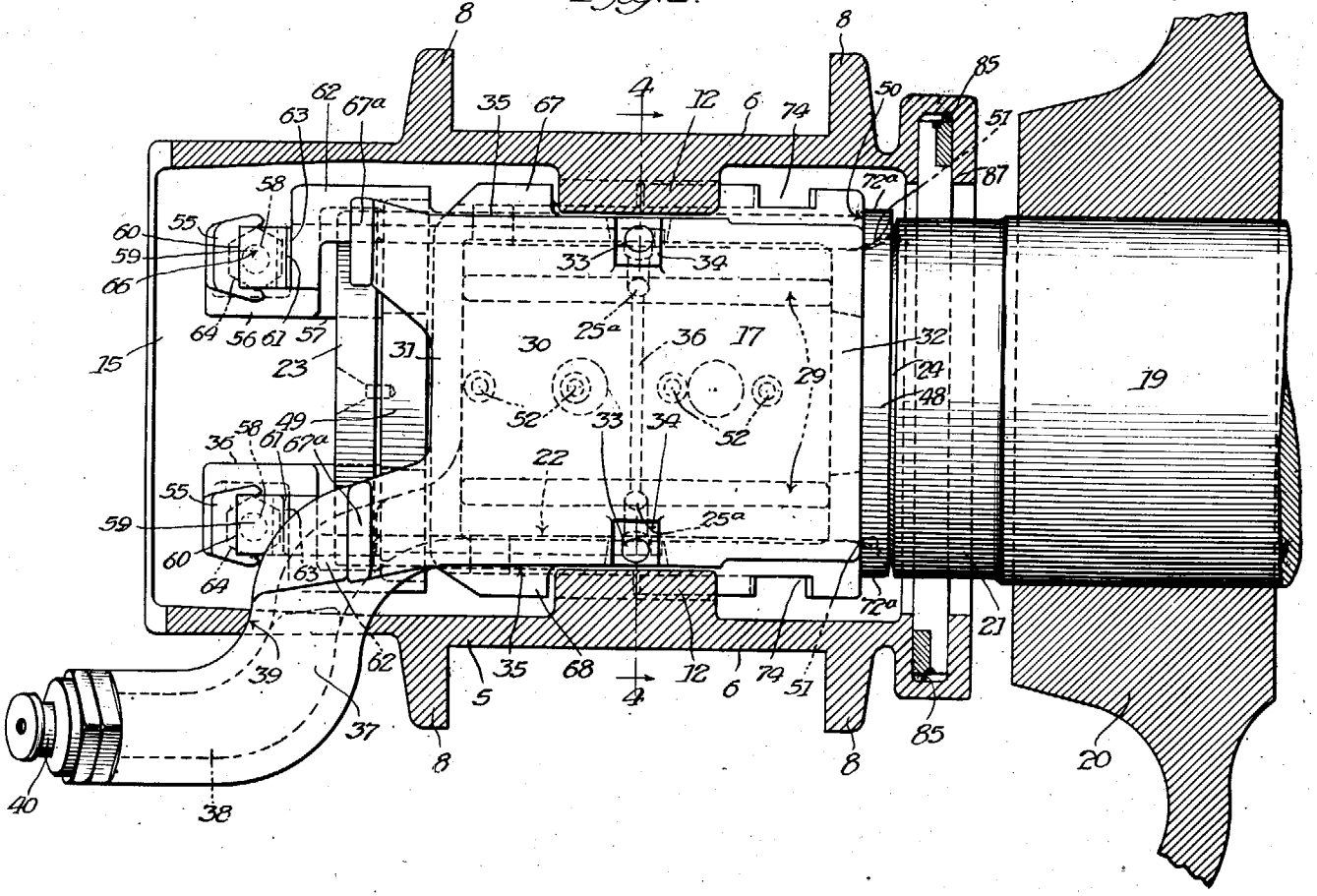
Figure 2 is a longitudinal sectional view taken on the line 2—2 of Figure 1, looking in the direction indicated by the arrow.

It is obvious that this shield must be detachably supported so that it will clear at least the flanges 48, in assembling the device, and to this end the opposite ends of the curved portion 70 are extended in straight portions indicated at 72, 72. It will be understood that to facilitate the removal of the bushing sections when the shield is dropped into the bottom of the box and to permit the parts of the flange 48 to pass the ends of the shield, complemental portions of the flanges are cut away or flattened as indicated at 72*a*—72*a*, which allows this portion of the flange to pass the adjacent ends of the shield when withdrawing the bushing sections from the box. These straight portions are connected to the adjacent longitudinal side walls of the block 17 by the provision, as best shown in Figures 1 and 2, of vertically extending inclined lugs 73 which lie in complemental recesses 74 formed in the adjacent lower portions of the side walls of the block 17. When the lugs 73 enter the recesses 74 by vertical lifting of the shield 69, a rearward movement of the shield takes place, that is to say, the shield moves up and back toward the wheel end of the journal. This movement is facilitated by the shape of the lugs 73 and recesses 74. In order to retain the shield in its position, I provide pawl members, only one of which appears, and best shown in Figure 1. This pawl member, indicated at 75, is provided with a detent 76 and mounted on a fulcrum 77, which is in the nature of a trunnion extending into a suitable cylindrical aperture 78 formed in the adjacent lower edges of the block 17. The pawl 75 is provided with a lever extension 79, which is adapted to engage an abutment portion 80 in the adjacent upper edge of the shield 69, a complemental notch 81 being formed in said upper edge of the shield for receiving the detent portion 76 of the pawl. Thus it will be observed that when the shield is moved vertically into position to be retained the rearward movement due to the lugs 73 and their complemental recesses 74 and the abutment of the lever portion 79 with the recess 80 causes the portion 76 of the pawl to engage in the notch 81 and effectually retain the shield in position. Due to the inclined lugs 73 and the inclined surface of the notch 81, it is impossible for the shield to drop out of position due to vibration of the bearing in operation. Removal of the shield may be conveniently accomplished by slight raising of the same at the center to disengage the pawl. When this is accomplished the lugs 73 may then be dropped out of engagement with the recesses 74 and the shield thus dropped out of operative position.

The retention by the pawl member is facilitated by the provision of longitudinal vane 82, formed on the inner lower edges of the lever portions 79, this vane having an inclined surface and engaging complemental surfaces formed on the adjacent edges of the shield. Thus when the shield is placed in position it is brought beneath the bushing, raised until the outer end, that is, the end adjacent to the pawl, is in abutment with the pawl and the pawl raised; continued raising of the shield brings the lugs 73 into the recesses 74. Upon releasing the shield it will drop for a short distance until the inclined surfaces of the pawl 73 engage the adjacent walls of the recesses 74 and the pawl being in engagement with the notches 81 will retain the shield. In removing shield, due to the vertical displacement of the forward end, the shield is raised sufficiently to permit the lugs 73 to be disengaged from the notches 74 whereupon the shield will drop clear.

The pawls are retained against displacement laterally owing to the fact that the vanes 82 lie inside of the adjacent inclined surfaces of the ends of the shield, and the lever portions are adjacent to the side stops 12, and thus while in operative position the pawls cannot become displaced laterally.

From the foregoing it will be observed that the block 17, floating bushing and its associated parts, and the shield, together with the pawl members for retaining same, may be all introduced into a standard A. R. A. journal box with practically little or no change in the box structure other than to cut a recess for the neck 37 in one of the walls of the box. This can be accomplished readily by an acetylene torch or other convenient means. It will be observed also that when the bearing is in operation a substantially constantly changing bearing surface is presented to the journal and to the bearing block 17, commonly known as a wedge, and that an adequate and efficient source of lubricant is provided at all times, particularly in that the source of lubricant is constantly available whether the bearing is rotated or not. Waste of lubricant is substantially entirely eliminated inasmuch as the lubricant which may escape at the ends of the bushing between the bushing and journal or between the bushing and shield is a relatively small amount, and the major part of the lubricant is retained until its lubricating properties have been entirely consumed. It will also be understood that the arrangement of the floating bushing does not prevent the desirable end play or lateral movement of the box with respect to the journal but that said end play is permitted within desirable limits and that this invention also provides for the necessary heeling which takes place when the car rounds curves.

It will be understood that in order to permit of the insertion of the shield into the box, this being accomplished from the wheel end of the box before the journal is in position, a portion of the flanges forming the channels or recesses 85 will have to be removed inasmuch as in the standard box these channels are slightly deeper than is required in the present invention.

In the assembly of the bushing sections of the bearing in the journal box, the two bushing sections are first applied to the journal and tightened on the journal in proper running position. The shield is then hung over the bushing upside down. The journal and the shield, together with the bushing, are now ready to receive the box which is applied bottom side up to the journal, that is to say, the bushing, the shield and the journal are all inserted in this position with the bottom side up into the box.

The journal box is then rotated on the journal, which, due to the contact between the box wall 14 and the rib 71, causes the shield to rotate with the box. The box is then jacked up to hold the shield against the lower portion of the adjacent bushing section. This raises the top of the box to sufficient distance beyond the upper part of the bushing to permit of the insertion of the bearing block 17. This bearing block is inserted to a distance until the lugs 67 are adjacent to the side stops 12 and the projections 67*a* are inside of the front stops 10*a*. When the block 17 is in proper contact with the shield the box is lowered on to bearing block 17 by removing the jack. It is to be kept in mind that the jack holds the bottom of the box against the rib 71 and thus raises the shield the short distance allowed between the shield and the adjacent bushing section, so that the upper edges of the shield are a slight distance higher than they normally assume in operation, and that therefore when the jack is removed the block, having become engaged with the shield and resting on the adjacent bushing section, retains the shield by virtue of the pawl engagement from dropping into the box.

It will be understood that where quick repairs are to be made on cars in service, this may be done merely by jacking up the truck frame to remove the box, and the bushing may be then applied to the journal and the shield placed in the box beneath the bushing, the box jacked up on the journal and the bearing block inserted so that the same becomes connected with the shield.

It will be understood that the description hereinabove appearing of assembly of the box and bearing parts of this invention is alternative, and, dependent upon the prevailing conditions, may be departed from by the mechanic at the time of the installation.

Having thus described my invention and illustrated its use, what I claim as new and desire to secure by Letters Patent is:

1. In a journal bearing, in combination, a box or housing having an opening at one end and adapted to receive a journal, a bearing block in said box, a revoluble floating sectionalized bushing member surrounding the journal and provided with annular flanges radially extending to receive the bearing block, and means on said bushing including a wedge member for bringing the sections of said bushing into engagement with the journal.

2. In a journal bearing, in combination, a box or housing having an opening at one end and adapted to receive a journal, a bearing block in said box, a revoluble floating bushing member surrounding the journal and provided with annular end flanges radially extending to receive the bearing block, and a lubricant shield supported from the bearing block and encircling said floating bushing in spaced relation thereto.

3. In a journal bearing, in combination, a box or housing having an opening at one end adapted to receive a journal, a bearing block in said box adapted to contain a lubricant, a revoluble floating bushing surrounding the journal and in contact with the bearing block, a shield for said bushing removably supported by said bearing block and surrounding but spaced from the bushing, and means extending from said journal box for introducing lubricant into said bearing block.

4. In a journal bearing, in combination, a box or housing having an opening at one end adapted to receive a journal, a bearing block in said box adapted to contain a lubricant, a revoluble floating bushing surrounding the journal and in contact with the bearing block, and a detachable shield for said bushing supported by said bearing block in spaced relation to said bushing.

5. In a journal bearing, in combination, a box or housing having an opening at one end adapted to receive a journal, a bearing block in said box adapted to contain a lubricant, a revoluble floating bushing surrounding the journal and in contact with the bearing block, a shield for said bushing surrounding in spaced relation to and underlying the bushing, and a locking pawl for detachably connecting said shield to said bearing block.

6. In a journal bearing, in combination, a box or housing having an opening at one end adapted to receive a journal, a bearing block in said box adapted to contain a lubricant, a revoluble floating bushing surrounding the journal and in contact with the bearing block, a shield for said bushing surrounding in spaced relation to and underlying the bushing, and a locking pawl for detachably connecting said shield to said bearing block, and fixed abutments on said shield and bearing cooperating with said pawl.

7. In a journal bearing, in combination, a box or housing having an opening at one end and adapted to receive a journal, a bearing block in said box adapted to contain a lubricant, a revoluble floating bushing surrounding the journal and in contact with the bearing block, said bushing being made in separable sections, said sections having cooperating marginal portions and means carried by the outer ends of said sections for relatively moving said sections and thereby to cause said marginal portions to bring said sections together for clamping them about said journal.

8. In a journal bearing, in combination, a box or housing having an opening at one end adapted to receive a journal, a bearing block in said box adapted to contain a lubricant, a revoluble floating bushing surrounding the journal and in contact with the bearing block, said bushing being made in separable half sections, said sections having cooperating marginal portions and wedge means at the outer ends thereof for relatively sliding said sections to thereby cause said marginal portions to bring said sections together for clamping same about said journal.

9. In a journal bearing, in combination, a box or housing having on opening at one end and adapted to receive a journal, a bearing block in said box adapted to contain a lubricant, a revoluble floating bushing surrounding the journal and in contact with the bearing block, said bushing being made in separable sections, and means carried by said sections for clamping them about said journal, and a shield carried by said bearing block and encircling said bushing in spaced relation thereto.

10. In a journal bearing, in combination, a box or housing having a opening at one end and adapted to receive a journal, a bearing block in said box adapted to contain a lubricant, a revoluble floating bushing surrounding the journal and in contact with the bearing block, a shield for said bushing underlying the same, and a locking pawl for detachably connecting said shield to said bearing block, and fixed abutments on said shield and bearing cooperating with said pawl, said pawl being adapted to engage said shield upon an upward movement of the shield when the bearing is relieved of its dead load.

11. In a journal bearing, in combination with the journal and a journal box, a bearing block on which the journal box is mounted, a rotating split bushing surrounding the journal and in contact with a complemental surface of the block, said bushing having peripheral end flanges for engagement with the ends of the bearing block for limiting end play of the bushing, means for supplying lubricant through said block to said bushing, and a lubricant retainer or shield encompassing the bushing in spaced relation thereto.

12. In a journal bearing, in combination with the journal and a journal box, a bearing block on which the journal box is mounted, a rotating split bushing surrounding the journal and in contact with a complemental surface of the block, said bushing having peripheral end flanges for engagement with the ends of the bearing block for limiting end play of the bushing, complemental interlocking members on the parts of said bushing, and means for clamping the parts of said bushing onto the journal.

13. In a journal bearing, in combination with the journal and a journal box, a bearing block on which the journal box is mounted, a rotating split bushing surrounding the journal and in contact with a complemental surface of the block, said bushing having peripheral end flanges for engagement with the ends of the bearing block for limiting end play of the bushing, complemental interlocking members on the adjacent edges of the parts of said bushing, and means for setting up a relative longitudinal movement of said parts to thus bring the parts of the bushing into running engagement with the journal.

14. In a bearing, a journal, a relatively fixed bearing member, a revoluble bushing interposed between said bearing member and said journal including arcuate sections having complemental recesses and projections, and wedge members engaging complemental portions of said arcuate sections for bringing said projections and recesses into operative engagement for clamping said bushing about said journal.

15. In a bearing, a journal, a relatively fixed bearing member, a revoluble bushing interposed between said bearing member and said journal including arcuate sections having complemental recesses and projections, and wedge members engaging complemental portions of said arcuate sections for bringing said projections and recesses into operative engagement for clamping said bushing about said journal, said sections having arcuate flanges forming end peripheral flanges, a shield surrounding said bushing and having its end edges encompassed within said flanges and serving to retain lubricant, and toggle means for releasably connecting said shield with said bearing member.

16. In a bearing, a journal, a relatively fixed bearing member, a revoluble bushing interposed between said bearing member and said journal including arcuate sections having complemental recesses and projections, and wedge members engaging complemental portions of said arcuate sections for bringing said projections and recesses into operative engagement for clamping said bushing about said journal, said sections having arcuate flanges forming end perihperal flanges, a shield surrounding said bushing and having its end edges encompassed within said flanges and serving to retain lubricant, and toggle means for releasably connecting said shield with said bearing member, said bearing block having recesses for engagement with complemental abutments on a journal box receiving said block for limiting endwise but permitting relative rocking movement between said block and journal box.

17. In a journal bearing, in combination, a box or housing adapted to receive a journal, a bearing block in said box, a rotating bushing comprising a plurality of sections surrounding said journal, and means for retaining said bushing sections in engagement with said journal including wedge portions integral with said bushing sections, whereby said sections may be moved relatively with respect to each other.

18. In a journal bearing, in combination, a box or housing adapted to receive a journal, a bearing block in said box, a rotating bushing comprising a plurality of sections surrounding said journal, and means for retaining said bushing sections in engagement with said journal, said means including portions of said sections interlocking with each other.

19. In a journal bearing, in combination, a box or housing adapted to receive a journal, a bearing block in said box, a rotating bushing comprising a plurality of sections surrounding said journal and means for retaining said bushing sections in engagement with said journal, said means including portions of said sections, and means for moving said sections interlocking with each other relatively with respect to each other.

20. In a journal bearing, in combination, a box or housing adapted to receive a journal, a bearing block in said box, a rotatable bushing comprising a plurality of sections surrounding said journal and having interlocking portions, and means for moving said sections relatively with respect to each other whereby said portions interlock to retain said bushing sections in engagement with said journal.

21. In a journal bearing, in combination, a box or housing having an opening at one end adapted to receive a journal, a bearing block in said box adapted to contain a lubricant, a revoluble floating bushing surrounding the journal and in contact with the bearing block, a shield for said bushing under-lying the same in spaced relation thereto and means for detachably supporting said shield on said bearing block including cooperating integral portions of said shield and said block.

22. In a journal bearing, in combination, a box or housing having an opening at one end adapted to receive a journal, a bearing block in said box, and a revoluble floating bushing surrounding the journal and in contact with the bearing block, said bushing being made in separable sections held together about said journal by means carried by said bushing sections, and the external load bearing area of said bushing being less than one half of the external circumferential area of said bushing.

23. In a bearing, a journal, a relatively fixed bearing member, a revoluble bushing interposed between said bearing member and said journal comprising a plurality of arcuate sections having complemental recesses and projections, and means including wedge portions integral with said sections for bringing said projections and recesses into operative engagement for retaining said bushing sections about said journal.

24. In a bearing, a journal, a relatively fixed bearing member, a revoluble bushing interposed between said bearing member and said journal comprising a plurality of arcuate sections having complemental recesses and projections, and wedge means for bringing said projections and recesses into operative engagement for retaining said bushing sections about said journal comprising cooperating extended portions of said bushing sections and means for connecting said extended portions.

25. In a bearing, a journal, a relatively fixed bearing member, a revoluble bushing interposed between said bearing member and said journal comprising a plurality of arcuate sections having complemental recesses and projections, and wedge means for bringing said projections and recesses into operative engagement for retaining said bushing sections about said journal comprising cooperating extended portions of said bushing sections and means for connecting said extended portions, said extended portions and connecting means affording means for causing a resilient force to maintain the relation of said bushing sections.

26. In a journal bearing, in combination, a box or housing having an opening at one end adapted to receive a journal, a bearing block in said box adapted to convey a lubricant, means for supplying lubricant to said bearing block, a revoluble floating bushing surrounding the journal and in contact with the bearing block, said bushing being made in a plurality of separable sections, and means for retaining said bushing sections about said journal consisting of cooperating integrally formed wedge portions of said sections and connecting means for causing the said wedge portions to cooperate.

27. In a bearing, a journal, a relatively fixed bearing member, a revoluble bushing interposed between said bearing member and said journal comprising a plurality of arcuate sections and means on said bushing including a wedge member for bringing the sections of said bushing into engagement with the journal.

28. In a bearing, in combination, a journal, a bearing block, a revoluble floating bushing member surrounding said journal, and a lubricant shield supported from the bearing block and encircling said floating bushing in spaced relation thereto.

29. In a bearing, in combination, a journal, a bearing block, a revoluble floating bushing member surrounding the journal and provided with annular end flanges radially extended to receive the bearing block, and a lubricant shield supported from the bearing block and encircling said floating bushing in spaced relation thereto and between said annular end flanges of said bushing.

WILLIAM HUNTER HECKMAN.